(12) United States Patent
Steinlage et al.

(10) Patent No.: US 8,006,775 B2
(45) Date of Patent: Aug. 30, 2011

(54) STRIP TILLAGE IMPLEMENT

(75) Inventors: David L. Steinlage, Adel, IA (US); Jarrod Ray Ruckle, Bondurant, IA (US)

(73) Assignee: Deere & Company, Moline, IL (US)

( * ) Notice: Subject to any disclaimer, the term of this patent is extended or adjusted under 35 U.S.C. 154(b) by 222 days.

(21) Appl. No.: 12/105,954

(22) Filed: Apr. 18, 2008

(65) Prior Publication Data

US 2008/0190628 A1 Aug. 14, 2008

Related U.S. Application Data

(63) Continuation-in-part of application No. 11/522,269, filed on Sep. 15, 2006, now Pat. No. 7,513,316.

(51) Int. Cl.
*A01B 5/00* (2006.01)
(52) U.S. Cl. ........................ 172/151; 172/146
(58) Field of Classification Search .................. 172/146, 172/151
See application file for complete search history.

(56) References Cited

U.S. PATENT DOCUMENTS

| | | | |
|---|---|---|---|
| 3,757,871 A * | 9/1973 | Maust et al. .................. 172/178 |
| 4,187,916 A * | 2/1980 | Harden et al. ................ 172/146 |
| 4,828,042 A * | 5/1989 | Arnold .......................... 172/572 |
| 5,080,178 A | 1/1992 | Dietrich, Sr. |
| 5,333,694 A * | 8/1994 | Roggenbuck et al. ........ 172/156 |
| 5,341,754 A * | 8/1994 | Winterton ..................... 111/139 |
| 5,474,135 A | 12/1995 | Schlagel |
| 5,499,685 A | 3/1996 | Downing, Jr. |
| 5,524,711 A * | 6/1996 | Harris ............................. 172/67 |
| 5,704,430 A | 1/1998 | Smith et al. |
| 5,797,460 A * | 8/1998 | Parker et al. .................. 172/151 |
| 5,957,217 A * | 9/1999 | Gunnink ........................ 172/166 |
| 6,068,061 A * | 5/2000 | Smith et al. .................... 172/139 |
| 6,276,462 B1 * | 8/2001 | Dietrich, Sr. .................. 172/138 |
| 6,679,339 B1 * | 1/2004 | Steinlage et al. ............. 172/395 |
| 6,681,868 B2 | 1/2004 | Kovach et al. |
| 6,761,120 B2 * | 7/2004 | Kovach et al. ................ 111/140 |
| 6,871,709 B2 | 3/2005 | Knobloch et al. |
| 7,017,675 B2 * | 3/2006 | Ankenman et al. ........... 172/146 |
| 2005/0263050 A1 | 12/2005 | Bassett et al. |

OTHER PUBLICATIONS

Orthman Manufacturing, Co; Orthman introduces all new seed bed preparation system; New Product Announcements; printed Mar. 18, 2008; (2 pages); www.orthoman.com/htm/newprod.htm.
DMI; Yield-till system; nutri-till'r 5310; printed Mar. 18, 2008; (3 pages); www.dmifarm.com/YTS/rootzone/ytsrzbnp5310feat.html.

(Continued)

*Primary Examiner* — Thomas B Will
*Assistant Examiner* — Joel Mitchell (57) ABSTRACT

A strip tillage implement includes a plurality of forward disk gang members for sizing plant residue. An upright tool support bracket extends rearwardly from the rear frame member and defines a downwardly opening accommodation space at a top portion of the bracket for a closing disk assembly rockshaft or support. The bracket includes a lower end supporting a parallel linkage that carries a clearing tool assembly in a generally constant horizontal attitude as the linkage pivots with movement of the clearing disks over obstacles. A tool support arm is pivotally connected to the bracket adjacent the parallel linkage and below the rear frame member. A closing disk arm supported from the rockshaft can be rotated to adjust down pressure or to lift the closing disk is completely out of ground contact. Closing disk spacing and disk angle are adjustable to provide the desired berm shape. Each closing disk arm is relatively long and independently supported to reduce torsional forces and improve plugging resistance of the units.

20 Claims, 7 Drawing Sheets

OTHER PUBLICATIONS

BB Bigham Brothers, Inc.; Bigham Brothers Tillage Equipment Lilliston Rolling Cultivators; Super Duty StripTill; printed Mar. 18, 2008; (1 page); www.bigbrothers.com/strip-till-super-duty.htm.

Redball, LLC; Applying Innovation; Model 2000 Toolbars; printed Mar. 18, 2008; (6 pages); www.reballproducts.com/products/strip_till_equipment/2000.php.

* cited by examiner

STRIP TILLAGE IMPLEMENT

This is a continuation-in-part of our commonly assigned application Ser. No. 11/522,269 filed 15 Sep. 2006 now U.S. Pat. No. 7,513,316 and entitled "Implement Rear Hitch Height and Attitude Control".

FIELD OF THE INVENTION

The present invention relates generally to tillage implements and, more specifically, to strip tillage machines.

BACKGROUND OF THE INVENTION

Many growers in the United States are currently switching from conventional tillage methods or minimum tillage methods to zone or strip tillage methods to reduce input costs and increase crop yields. The strip tillage machines currently on the market are designed to perform zone tillage, apply product such as fertilizer, and make a mellow, friable seedbed for the upcoming crop. Residue levels for strip tillage range from light soybean stubble to heavy standing corn stubble.

Individually mounted front coulters are typically used with most conventional strip tillage machines. New corn hybrids with taller and stronger stalks increase problems of residue management with the strip tillage practices. An extra pass with a coulter cart or stalk chopper is often required to promote decomposition and help residue flow through the conventional strip tillage machines. A strip tillage machine that eliminates the extra pass is desirable to increase productivity.

Strip tillage row cleaners that clear residue off a strip of ground typically eight to ten inches wide must be able to operate in the tough, heavy corn residue conditions. Cleaners on conventional strip tillage machines may not have sufficient aggressiveness and residue flow capacity for the high residue conditions in corn stubble and the like. Also, the cleaners must be able to move vertically over obstacles. Providing an aggressive strip tillage row cleaner assembly with satisfactory trip and residue clearance has been a continuing source of problems. If the clearing disks fail to remain in a generally level attitude during vertical movement, efficient trash clearing and residue shedding characteristics can be compromised.

Trailing covering disks in strip tillage machines are designed to catch the dirt spray off a forwardly mounted tool such as a fertilizer knife and move the dirt back over the row to seal the applied product and make a berm. Some machines have floating closing disks while others include closing disks set to operate at a set depth. In some implements, short closing arms connected by a support located closely adjacent the earthworking tool cause severe twisting moments in the assembly in uneven ground conditions, and trash cannot effectively clear behind the tool causing plugging and slugging. Short arms adversely affect the working angle of the disks as the closing disks rock vertically.

Often conventional strip tillage machines fail to provide simple adjustments to vary characteristics of the strip till berms such as berm size and berm shape to accommodate varying field conditions on-the-go. For example, current adjustments may be inadequate if the operator encounters sandy conditions wherein the closing disks operate too deeply and cause plugging and unsatisfactory berms. Providing a single-pass strip tillage machine that is operable in heavy corn stubble, easily adjusted on-the-go, and compact in design has been a source of difficulty.

SUMMARY OF THE INVENTION

It is therefore an object of the present invention to provide an improved strip tillage machine that overcomes the aforementioned problems. It is a further object of the invention to provide such a machine that is particularly useful in heavy residue conditions such as corn stubble.

It is another object of the present invention to provide a single-pass strip tillage machine that is operable in heavy corn stubble and easily adjusted on-the-go, and yet is compact in design.

A strip tillage machine includes a front-mounted coulter or disk gang with disks spaced on the order of fifteen inches to eliminate need for an extra pass and increase residue slicing. The increased slicing improves residue flow and organic breakdown of the stalks. The gang mounting decreases manufacturing and maintenance costs, and a hydraulic disk depth control system permits independent on-the-go adjustments of applicator tool depth and disk depth. The leading disk gangs may be lifted completely out of ground contact in light residue conditions such as bean stubble. The disk cutting force can be held constant for following ground contour and rocking up over obstacles such as rocks. At the start of a pass, the disks cut stalks before the applicator tool engages the soil so the applicator is always running in cut residue.

The row cleaner assembly is mounted on parallel links to maintain the proper working attitude of staggered cleaning disks throughout the trip range. The assembly is supported compactly under the rear frame member and provides for easy tool spacing and good trash flow. An adjustment screw and spring assembly applies row cleaner down pressure and allows the cleaner to be adjusted vertically. The structure provides aggressive row cleaning, good trash flow, and protective tripping over obstacles.

The strip tillage machine includes a closing disk system having a rockshaft with closing disks adjustably mounted at the aft ends of leaf springs. Down-pressure is controlled by a cylinder connected to the rockshaft and to an adjustable hydraulic control valve. Each rockshaft supports a plurality of relatively long closing disk arms. The arms are fabricated from spring steel and may have adjustable mounting locations to change the effective length of the arms and vary the distance between the disks and the applicator tool mounting. Angle adjustment structure also allows the disk blades angles to be varied to make a taller or flatter berm. Cylinder retraction applies down force so that closing disk working depth can be adjusted using a cylinder stop on the rod end of the cylinder. In soil conditions such as loose sand, the stop prevents excessive closing wheel depth that would otherwise cause plugging and unsatisfactory berms. In an alternate embodiment, floating closing disks are supported from a beam connected directly to a mounting bracket. A pair of closing disk arms extend rearwardly from the beam.

A unique mounting bracket connects several components to the machine frame to reduce manufacturing costs and maintain a compact assembly. The mounting bracket accommodates the closing disk rockshaft or the closing disk mounting beam and allows the row cleaners and closing disks to be conveniently mounted and accessed in a relatively small area. In both the floating disk version and the rockshaft version, the closing disk arm lengths are greater than the lengths on most currently available implements so that vertical motion of the disks does not adversely affect disk working angles. By mounting the closing disk arms individually near the forward-most portion of each unit, severe bending moments on the assembly are reduced, arm flexibility can be increased if desired, and resistance to plugging is increased.

These and other objects, features and advantages of the present invention will become apparent in view of the drawings and description which follows.

DESCRIPTION OF THE PREFERRED EMBODIMENT

Figure 1:
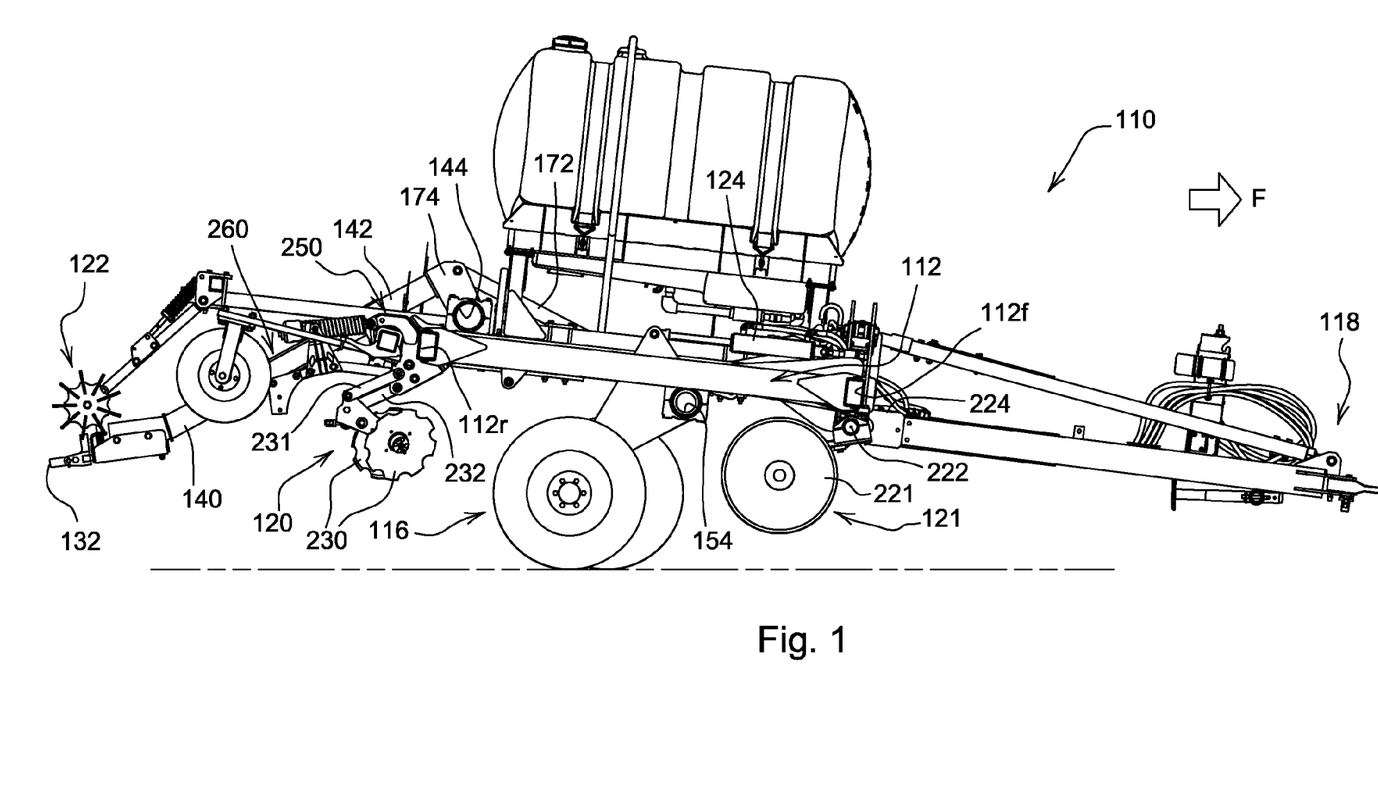
FIG. 1 is a side view of an implement with additional rear tools and with an alternate embodiment of a leveling hitch including a hitch rockshaft.
Figure 2:
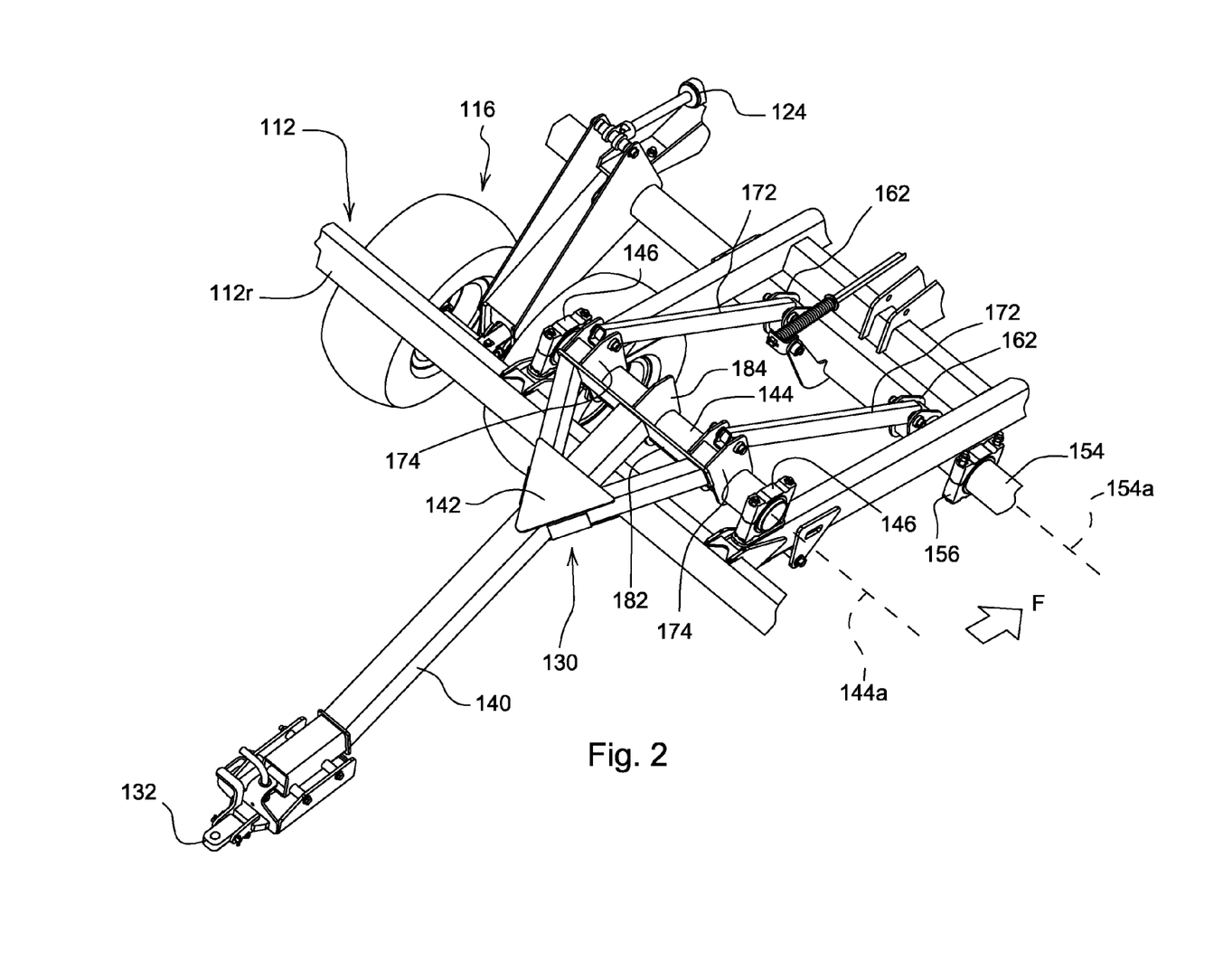
FIG. 2 is an enlarged perspective view of the leveling hitch of FIG. 4.
Figure 3:
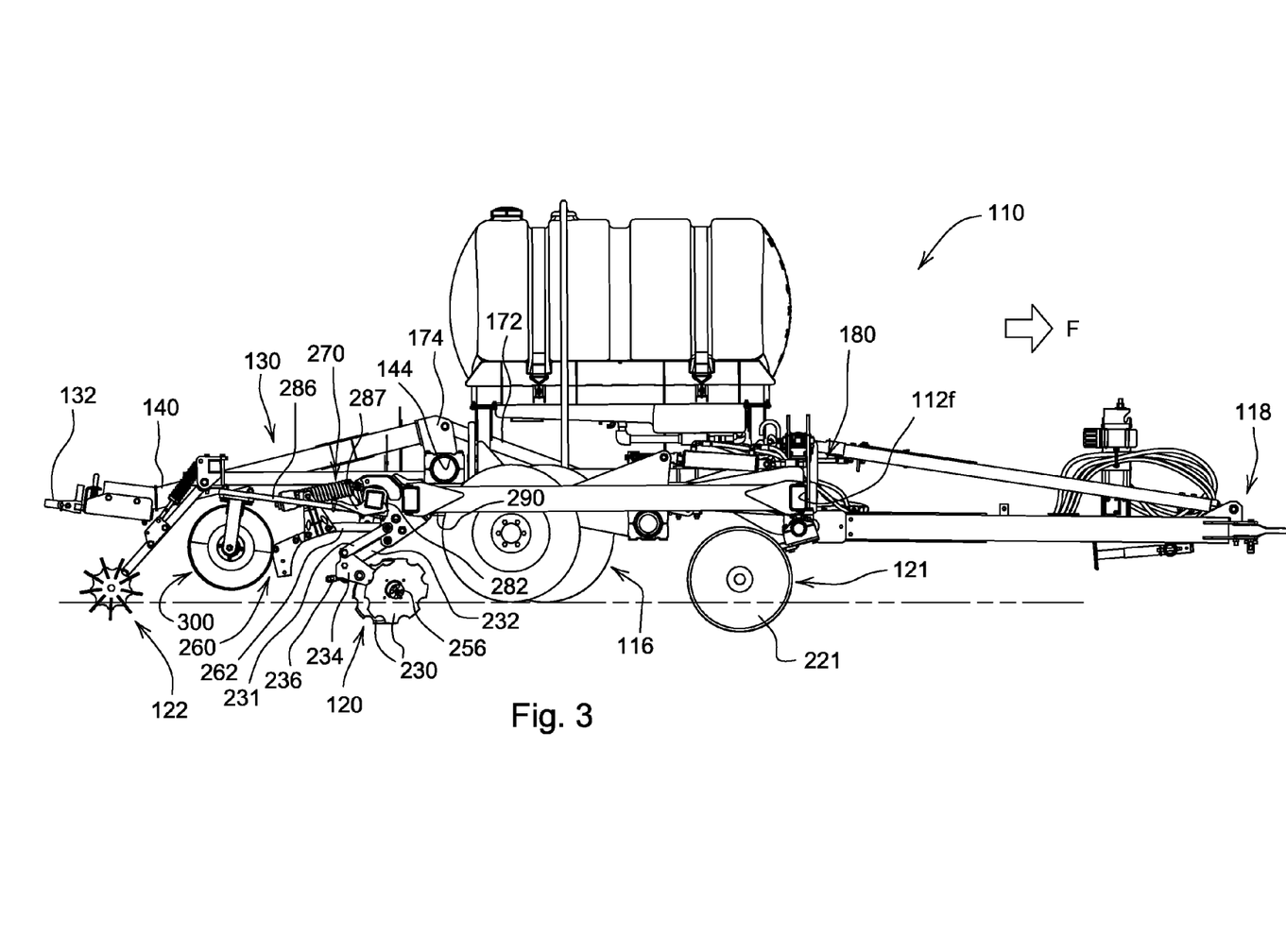
FIG. 3 is a view similar to FIG. 1 but showing the implement in the lowered field-working position.
Figure 4:
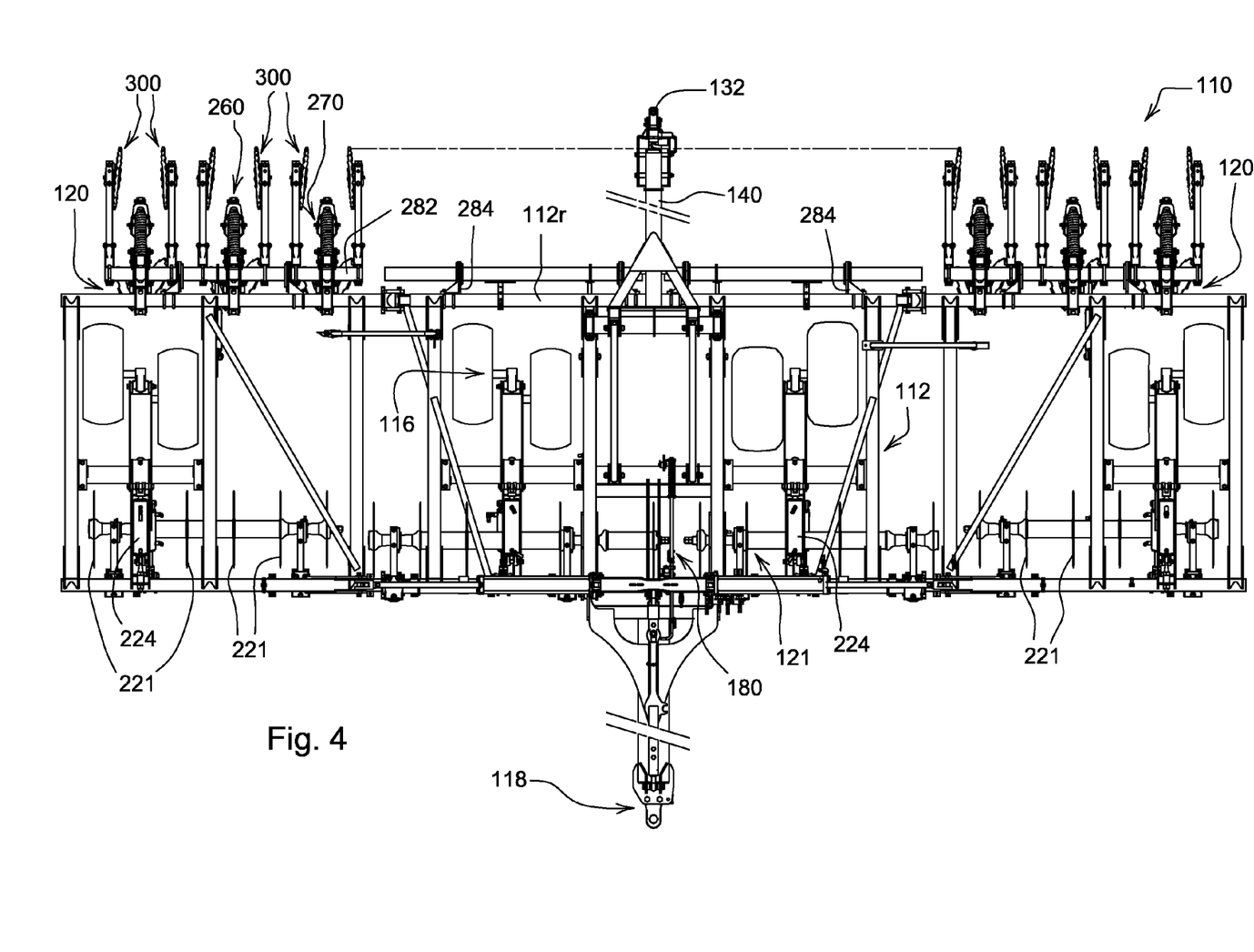
FIG. 4 is a top view of the implement of FIG. 1.

Referring to FIGS. 1-3, a strip tillage implement 110 includes a main frame 112 supported by lift wheel assemblies 116 for forward movement (F) over the ground. A forward hitch assembly 118 adapted for connection to a towing vehicle (not shown) is attached to the frame 112. The frame 112 supports conventional earth engaging tools and trailing tools indicated generally at 120, 121 and 122 substantially behind a rearmost portion or rear frame member 112r of the main frame 112.

Hydraulic cylinders 124 operably connected to the lift wheel assemblies 116 raise and lower the frame 112 for moving the implement 110 between a raised transport position (FIG. 1) and lowered field-working positions (FIG. 3). A rear hitch assembly 130 is movably mounted on the main frame 112 and includes a rear connector 132 for towing a trailing implement (not shown) behind the trailing tools 122.

The rear hitch assembly 130 includes a main hitch beam 140 having a rearwardly and downwardly directed end supporting the rear connector 132, and a forwardmost end 142 fixed to a separate hitch rockshaft 144 supported for rotation about a hitch rockshaft axis 144a located above the main frame 112. Rockshaft support journals 146 connected to the frame adjacent the rearmost portion 112r rotatably mount the rockshaft 144 on the frame 112.

An implement lift rockshaft 154 is rotatably mounted on the frame 112 by journals 156 for rotation about a transversely extending lift axis 154a located below the frame. The lift rockshaft 154 is located rearwardly of a forward frame member 112f and forwardly of the rearmost member 112r. The lift wheel assemblies 116 are connected for rotation with the rockshaft 154 between a transport position (FIG. 1) and a field-working position (FIG. 3). Transversely spaced lever arms 162 are fixed to a central portion of the rockshaft 154 and extend radially from the rockshaft axis 154a upwardly and rearwardly towards the hitch rockshaft 144. Links 172 include lower forward ends pivotally connected to the lever arms 162 and upper aft ends pivotally connected to hitch rockshaft arms 174 transversely spaced on the rockshaft 144. The forwardmost end 142 of the beam 140 is connected to a mounting plate 182 fixed to the arms 174 and to a central mounting plate 184. As the cylinders 124 are extended to rotate the lift rockshaft in the counterclockwise direction, the wheel assemblies 116 lower to raise the frame 112. At the same time, the links 172 cause the hitch rockshaft 144 to also rotate in the counterclockwise direction to rotate the connector 132 downwardly about the axis 144a to maintain a generally constant rear hitch height above the ground. Retraction of the cylinders 124 rotates the lift rockshaft 154 in the clockwise direction to raise the wheel assemblies 116 and lower the frame 112. The hitch rockshaft 144 is rotated in the clockwise direction to rotate the connector 132 upwardly about the axis 144a to maintain hitch connector height. A conventional forward hitch control 180 (FIG. 2) helps to level the main frame 112 as the implement 110 is raised and lowered.

The rear hitch assembly 130 is located substantially behind the forwardmost frame member 112f and behind and above the lift rockshaft 154 (FIG. 3) for minimal interference with trash and soil flow under the frame 112 during field-working operations. The over-frame rear hitch construction facilitates good flow characteristics and mounting of the tools 120 at any desired location on the aft member 112r without rear hitch interference. The single beam hitch construction is easily accommodated between adjacent pairs of trailing implements 122, such as rolling basket assemblies shown in FIG. 1, both in the transport and the field-working positions.

Referring to FIGS. 1-4, the forward tools 121 are gangs of disks or coulter blades 221 extending transversely to the forward direction F. As shown, the disk blades 221 are uniformly spaced at intervals on the order of fifteen inches across the width of the implement 110 so that residue is sliced by no less than two disk blades for each berm being formed. The gangs of blades 221 are mounted for pivoting about axes 222 by hydraulic cylinder assemblies indicated generally at 224 to vary the depth of penetration of the blades 221 in dependence on soil and trash conditions. The gangs of blades 221 can be lifted from the ground in light residue conditions.

Figure 5:
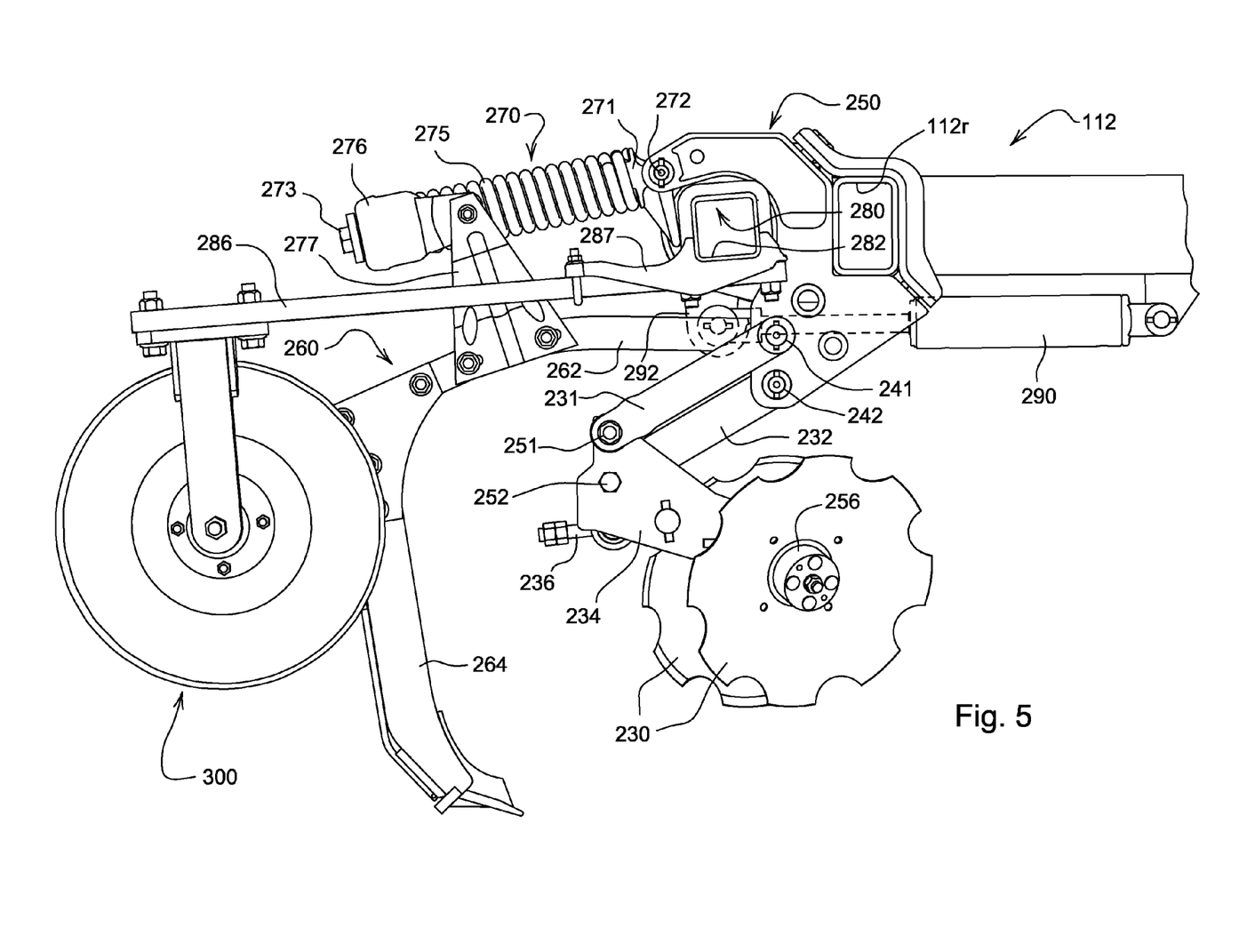
FIG. 5 is an enlarged side view of the bracket and tool assembly for the implement of FIG. 1.

The tools 120 as shown in FIGS. 1, 3 and 5 are clearing tool assemblies including pairs of staggered clearing disks 230 supported at the lower end of parallel linkage structure including upper and lower links 231 and 232. The lower trailing ends of the links 231 and 232 are pivotally connected to a row cleaner mounting 234 including an adjustment screw and spring assembly 236 that applies down force to the disks and adjusts the clearing disks vertically. The upper leading ends of the links 231 and 232 are connected at pivots 241 and 242, respectively, to an upright tool support bracket 250. The pivots 241 and 242 are located below the plane of the main frame 112 and aft of the rear frame member 112r. The mounting 234 is pivotally connected to the lower aft ends of the links 231 and 232 at locations 251 and 252 and extends forwardly to journal the clearing disks 230 for rotation generally under the rear frame member 112r. The disks 230 are connected to the forward end of the mounting 234 by hubs 256. As the disks 230 move up and down over obstacles, the parallel links 231 and 232 maintain a generally constant disk attitude relative to the ground so the operating characteristics of the clearing disks remain relatively unchanged.

A tillage or fertilizer tool support 260 is also pivotally connected to the support bracket 250 and includes a fore-and-aft extending tool arm 262 which carries an implement such as a fertilizer knife 264 rearwardly of the clearing disks and generally centered between the disks. The forward end of the arm 262 is pivotally connected to the bracket 250 at a location corresponding to the upper link pivot 241. The knife and support assembly may be of the type shown and described in co-pending and commonly assigned U.S. application Ser. No. 11/939,198 entitled "Fertilizer Knife and Point Structure" filed 13 Nov. 2007 and incorporated herein by reference. A down pressure assembly 270 (FIG. 5) is supported between the top rearward portion tool support 260 and the bracket 250. A spring support 271 is pivotally connected at 272 to the bracket 250, and a bolt or tension link 273 is threaded into the support 271. A spring 275 is compressed between an abutment surface on the support 271 and a rear saddle support 276 pivotally connected to mounting bracket extending upwardly from the arm 262 forwardly of the knife 264. The tension link 273 limits downward pivoting of the arm 262 and the knife 264 and adjusts the pre-compression of the spring 275. The spring 275 provides downward bias to yieldingly maintain the knife 264 in the ground.

Figure 6:
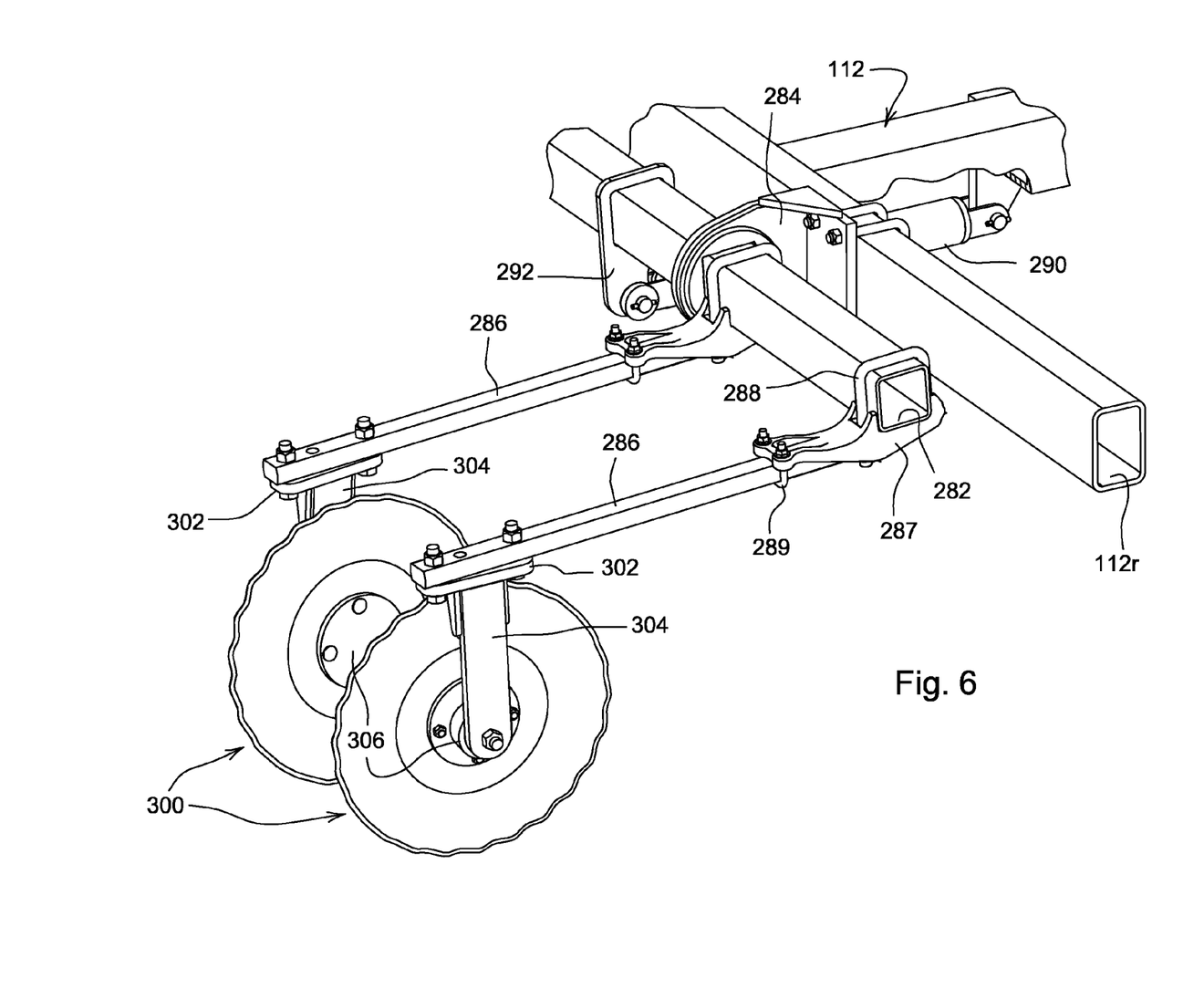
FIG. 6 is an enlarged perspective view of a portion of the closing disk assembly and closing disk rockshaft.

The bracket 250 not only provides a compact tool supporting arrangement but also defines a downwardly opening rockshaft or closing disk support accommodation space indicated generally at 280 in FIG. 5. A transversely extending rockshaft 282 is rotatably supported within the accommodation space 280 by rockshaft support brackets 284 (FIG. 6) bolted at transversely spaced locations to the rear frame member 112r. Closing disk arms 286 are adjustably bolted to the rockshaft 282 by arm brackets 287. U-bolts 288 and 289 can be loosened to facilitate transverse and fore-and-aft adjustments of the arms 286 to change berm size and shape. A cylinder 290 connected between the frame 112 and a lever 292 on the rockshaft 282 rotates the rockshaft. Transversely spaced covering or closing disks 300 are supported from the aft ends of adjacent pairs of arms 286 to move soil over the area penetrated by the knife 264 and form a berm. Adjustable brackets 302 are bolted to the aft ends of the arms 286, and upright disk supports 304 depend from the brackets 302. The disks 300 are rotatably mounted at the lower ends of the supports 304 by anti-wrap hub assemblies 306. The brackets 302 facilitate closing disk angle adjustments, and the cylinder 290 provides adjustable closing disk down pressure and allows the closing disks 300 to be raised and lowered relative to the ground. As shown in FIGS. 1 and 3, the closing disks 300 can be completely lifted from the ground when the frame is in the field-working position. Since the forward ends of the arms 286 are supported a substantial distance ahead of the tool 264, vertical movement of the closing disks 300 does not adversely affect disk angle.

Figure 7:
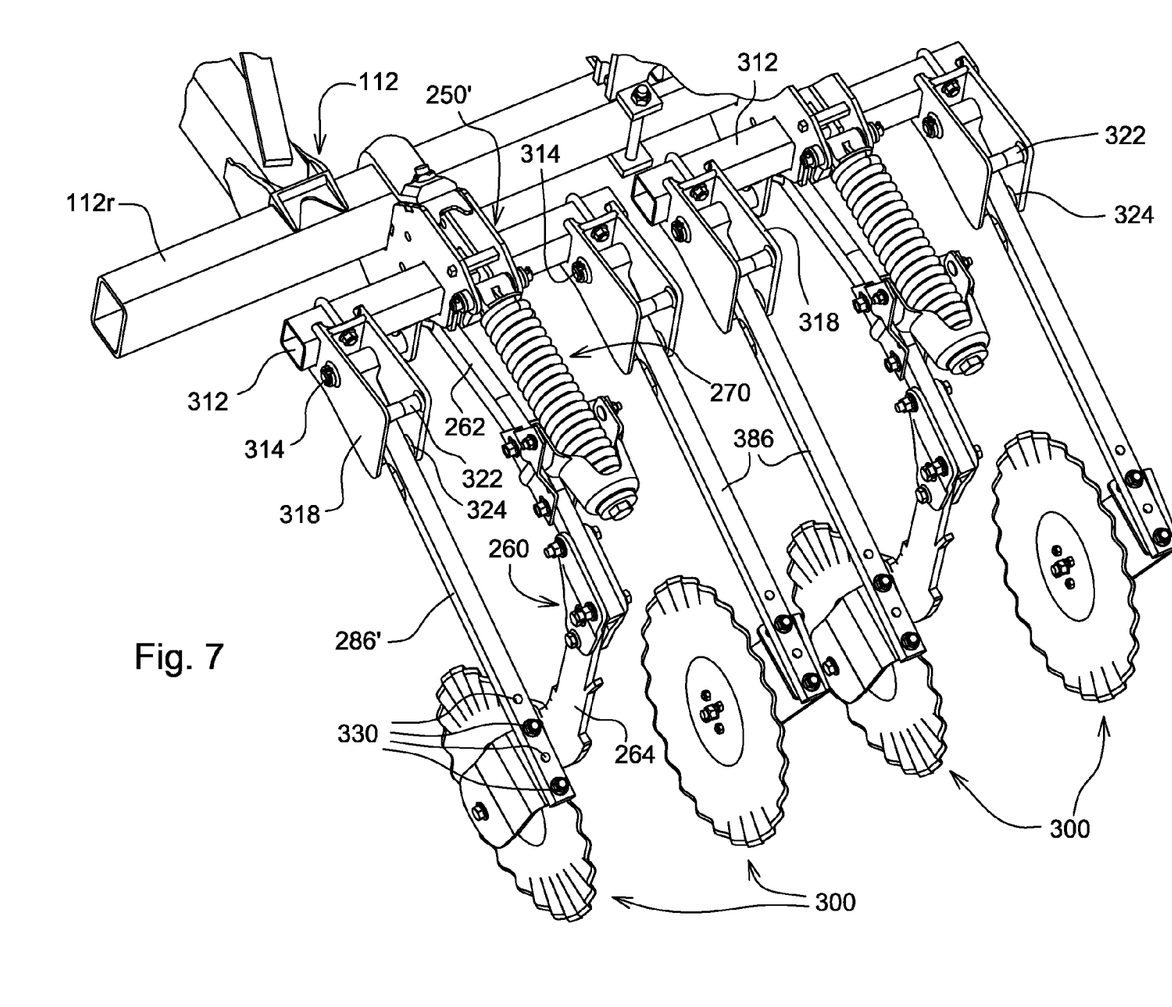
FIG. 7 is a rear perspective view showing an alternate closing disk mounting arm arrangement for implement of FIG. 1.

In the alternate embodiment of FIG. 7, a fixed closing disk arm mounting beam 312 is secured directly to a mounting bracket 250' for supporting a pair of closing disk arms 286'. The forward end of each arm 286' includes an eye pivotally connected at 314 to a bracket 318 secured at an end of the beam 312. The arms 286' can pivot about the locations 314 between upper and lower stops 322 and 324 within the brackets 318. A plurality of mounting apertures 330 at the aft end of the arm 286' provides fore-and-aft adjustment of the closing disks 300 relative to the corresponding knife 264. The brackets 302 may also be adjusted angularly relative to the arms 286'. The arms 286' have a length comparable to or slightly longer than the length of the tool arm 262 and provide a yielding downward spring bias to the closing disks.

Having described the preferred embodiment, it will become apparent that various modifications can be made without departing from the scope of the invention as defined in the accompanying claims.

The invention claimed is:

1. A strip tillage agricultural implement adapted for forward movement over ground where plant residue and obstacles are present, the implement comprising:
    a main frame having transversely extending front and rear frame members;
    lift wheel structure for raising and lowering the main frame between field-working and transport positions;
    a plurality of disk gang members connected to the front frame member and including a plurality of sizing disks for cutting the plant residue;
    an upright tool support bracket connected to the rear frame member, the bracket extending rearwardly from the rear frame member and defining a downwardly opening accommodation space at a top portion of the bracket;
    a parallel linkage having leading and trailing ends and pivotally connected at the leading end to a lower portion of the bracket below the rear frame member;
    a clearing tool assembly connected to the trailing end and including first and second transversely spaced clearing disks supported in generally a constant horizontal attitude as the parallel linkage pivots relative to the bracket to allow the clearing disks to pivot over the obstacles;
    a tool support having a fore-and-aft extending tool arm pivotally connected at a forward arm end to the bracket adjacent the parallel linkage and below the rear frame member;
    a fore-and-aft extending down pressure structure connected at its forward end to the top portion of the bracket and at its aft end to the tool arm;
    a rockshaft supported from the rear frame member in the downwardly opening accommodation space above the tool arm; and
    a closing disk arm supported from the rockshaft adjacent the tool arm, the closing disk arm having a forward end connected to the rockshaft and an aft end supporting a closing disk rearwardly of the tool arm, the closing disk arm rotatable by the rockshaft to a lift position wherein the closing disk is completely off the ground while the main frame is in the field-working position.

2. The agricultural implement as set forth in claim 1 wherein the closing disk arm comprises a generally planar spring bar member having a closing disk arm bracket bolted to the aft end of the arm for facilitating angular adjustments of the closing disk, wherein rotation of the rockshaft adjusts the down pressure of the closing disk.

3. The agricultural implement as set forth in claim 1 wherein the upright tool support bracket supports the rockshaft generally in alignment with and rearwardly adjacent the rear frame member so that the rockshaft lies generally within a plane defined by the main frame.

4. The agricultural implement as set forth in claim 1 wherein the clearing tool assembly includes hub structure and the hub structure extends forwardly from the trailing end of the parallel linkage to a position under the rear frame member when the main frame is in the field-working position.

5. The agricultural implement as set forth in claim 1 wherein the clearing tool assembly includes an adjustable down pressure bolt located behind and below the rear frame member.

6. The agricultural implement as set forth in claim 1 wherein the rockshaft is adjustable to vary the down pressure of the closing disk, the closing disk arm is fabricated from spring steel and the aft end of the closing disk arm is located behind an aft end of the tool arm for closing disk arm length and flexibility so that vertical motion of the closing disk with closing disk arm flexing does not adversely affect angle of the closing disk.

7. The agricultural implement as set forth in claim 6 including a rear hitch beam having a forward end adjustably supported above the rockshaft.

8. The agricultural implement as set forth in claim 1 wherein the disk gang extends perpendicularly to the forward direction.

9. The agricultural implement as set forth in claim 6 further comprising a trailing tool supported rearwardly of the closing disk, the trailing tool supported from a tool mounting member extending rearwardly and above the rear frame member.

10. The agricultural implement as set forth in claim 1 wherein the down pressure assembly is connected to the top portion of the bracket rearwardly of the accommodation space and above the closing disk arm.

11. The agricultural implement as set forth in claim 1 wherein the closing disk arm extends rearwardly from the rockshaft below and adjacent the down pressure assembly and above and adjacent the tool support.

12. A strip tillage agricultural implement adapted for forward movement over ground where plant residue and obstacles are present, the implement comprising:
- a main frame having transversely extending front and rear frame members;
- lift wheel structure for raising and lowering the main frame between field-working and transport positions;
- a plurality of disk gang members connected to the front frame member and including a plurality of sizing disks for cutting the plant residue, the sizing disks extending transversely to the forward direction;
- an upright tool support bracket connected to the rear frame member, the bracket extending rearwardly from the rear frame member and defining a downwardly opening accommodation space at a top portion of the bracket;
- a parallel linkage having upper and lower links with leading and trailing ends, the links pivotally connected at the leading ends to a lower portion of the bracket below the rear frame member;
- a clearing tool assembly connected to the trailing ends of the links and including first and second transversely spaced staggered clearing disks, the parallel linkage facilitating vertical movement of the clearing disks relative to the tool support bracket over the obstacles;
- a tool support having a fore-and-aft extending tool arm pivotally connected at a forward arm end to the bracket adjacent the parallel linkage and below the rear frame member;
- down pressure structure connected between the bracket and the tool arm for biasing the tool support towards the ground;
- a rockshaft supported from the main frame in the downwardly opening accommodation space above the tool arm; and
- first and second closing disk arms supported from the rockshaft adjacent and on opposite sides of the tool arm, each of the closing disk arms having an aft end supporting a closing disk rearwardly of the tool arm, the rockshaft rotatable from a lift position wherein the closing disk is completely off the ground while the main frame is in the field-working position to a ground contacting position, wherein the aft ends of the closing disk arms are non-connected and free to move vertically independently of each other.

13. The implement as set forth in claim 12 wherein the closing disk arm comprises a generally straight spring member having an aft end located rearwardly of an aft end of the tool arm, and a forward end located adjacent and above the forward end of the tool arm to thereby provide a yielding downward spring bias to the closing disk.

14. The implement as set forth in claim 12 wherein the upright tool support bracket includes vertically offset lower rear pivots supporting the leading ends of the links, and a tool pivot located adjacent the rear pivots and supporting the forward end of the tool arm.

15. The agricultural implement as set forth in claim 14 wherein the down pressure structure is connected to the top portion of the tool support bracket rearwardly of the accommodation space and above the closing disk arm.

16. The agricultural implement as set forth in claim 15 further comprising a trailing rolling basket, and a basket support arm supported from the main frame above the rockshaft.

17. The agricultural implement as set forth in claim 16 including a rear hitch beam having a forward end adjustably supported from the implement frame above the rockshaft.

18. A strip tillage agricultural implement adapted for forward movement over ground where plant residue and obstacles are present, the implement comprising:
- a main frame having a transversely extending rear frame member and a front frame member;
- lift structure for raising and lowering the main frame between field-working and transport positions;
- a plurality of disk gang members connected to the front frame member and including a plurality of sizing disks for cutting the plant residue, the sizing disks extending transversely to the forward direction;
- an upright tool support bracket connected to the rear frame member, the bracket extending rearwardly from the rear frame member and defining an accommodation space at a top portion of the bracket;
- a parallel linkage having upper and lower links with leading and trailing ends, the links pivotally connected at the trailing leading ends to a lower portion of the bracket below the rear frame member;
- a clearing tool assembly connected to the trailing ends of the links and including first and second transversely spaced staggered clearing disks, the parallel linkage facilitating vertical movement of the clearing disks over the obstacles;
- a fore-and-aft extending tool support arm pivotally connected at a forward arm end to the bracket adjacent the parallel linkage and below the rear frame member;
- an earthworking tool extending downwardly from the aft end of tool support arm;
- a closing disk support located in the accommodation space and extending transversely therefrom; and
- a pair of fore-and-aft extending closing disk arms supported from the closing disk support on opposite sides of the tool support arm, the closing disk arms each having an aft end supporting a closing disk rearwardly of the tool support arm and a forward end connected to the closing disk support forwardly of the earthworking tool, whereby each disk arm independently supports a single closing disk, the aft ends moveable vertically and independently relative to each other to provide independent vertical movement of the closing disks relative to each other.

19. The implement as set forth in claim 18 wherein the disk arms are pivotal vertically relative to the closing disk support to allow the closing disks to independently move over obstacles.

20. The implement as set forth in claim 18 wherein the closing disk arms have lengths comparable to the length of the tool support arm.

* * * * *